US006856130B2

(12) United States Patent
Sondergeld

(10) Patent No.: US 6,856,130 B2
(45) Date of Patent: Feb. 15, 2005

(54) IMPACT-INDUCED PULSE SENSOR

(75) Inventor: Manfred Sondergeld, St. Georgen (DE)

(73) Assignee: Gebr. Schmidt Fabrik für Feinmechanik GmbH & Co. KG, St. Georgen (DE)

( * ) Notice: Subject to any disclaimer, the term of this patent is extended or adjusted under 35 U.S.C. 154(b) by 0 days.

(21) Appl. No.: 10/649,175

(22) Filed: Aug. 27, 2003

(65) Prior Publication Data

US 2004/0119467 A1 Jun. 24, 2004

Related U.S. Application Data

(63) Continuation of application No. PCT/EP02/02225, filed on Mar. 1, 2002.

(30) Foreign Application Priority Data

Mar. 1, 2001 (DE) .......................................... 101 10 737
Apr. 9, 2001 (DE) .......................................... 101 18 491

(51) Int. Cl.[7] ................................................ G01B 7/14
(52) U.S. Cl. ............................ 324/207.15; 324/207.26
(58) Field of Search .......................... 324/174, 207.15, 324/207.22, 207.26; 340/551; 73/514.34; 307/10.1

(56) References Cited

U.S. PATENT DOCUMENTS

| 3,483,759 A | 1/1969 | Venetos et al. |
| 5,149,925 A | 9/1992 | Behr et al. |
| 5,608,270 A * | 3/1997 | Meister ...................... 307/10.1 |
| 5,723,789 A * | 3/1998 | Shannon ................... 73/514.31 |
| 5,756,896 A | 5/1998 | Schendel |
| 5,983,724 A | 11/1999 | Yoshida |

FOREIGN PATENT DOCUMENTS

DE 41 28 347 C1 12/1978

* cited by examiner

Primary Examiner—N. Le
Assistant Examiner—Reena Aurora
(74) Attorney, Agent, or Firm—Harness, Dickey & Pierce P.L.C.

(57) ABSTRACT

An impact-induced pulse sensor comprises a housing having a longitudinal axis and a guiding element arranged on the housing. A sensor element is adapted to be displaced within the housing along the guiding element when an essentially pulse-shaped impact of a given duration is exerted on the housing. The sensor element is displaced with a predetermined speed and along a predetermined distance. The guiding element is configured such as to affect the speed. The sensor element is made of a magnetic material. A pickup element is rigidly connected to the housing for magnetically generating a measuring signal derived from the displacing of the sensor element caused by the impact. The sensor element, when displaced, generates in the pickup element a measuring voltage depending from the distance. The guiding element affects the speed such that for impacts with like pulse areas the measuring voltage vs distance is independent from the duration of the pulse-shaped impact.

10 Claims, 3 Drawing Sheets

IMPACT-INDUCED PULSE SENSOR

CROSS-REFERENCE TO RELATED APPLICATIONS

This application is a continuation of International Patent Application Ser. No. PCT/EP02/02225, filed Mar. 1, 2002, designating the United States, which was published in German under PCT Article 21(s), and claims foreign priority benefit of German Patent Applications Ser. No. 101 10 737.4, filed Mar. 1, 2001 and Ser. No. 101 18 491.3, filed Apr. 9, 2001.

FIELD OF THE INVENTION

The present invention relates to the field of impact-induced pulse sensors. More specifically, the invention is related to an impact-induced pulse sensor comprising a housing having a longitudinal axis, a guiding element arranged on the housing, a sensor element adapted to be displaced within the housing along the guiding element when an essentially pulse-shaped impact of a given duration is exerted on the housing, the sensor element being displaced with a predetermined speed and along a predetermined distance, the guiding element being configured such as to affect the speed, the sensor element, further, being made of a magnetic material, and a pickup element rigidly connected to the housing for magnetically generating a measuring signal derived from the displacing of the sensor element caused by the impact.

Impact-induced pulse sensors of the afore-mentioned kind are, for example, used in the motor car industry for detecting a collision of the motor car, in particular in combination with an overturn thereof.

BACKGROUND OF THE INVENTION

In the prior art various sensors have been developed for the purpose of detecting a collision situation in a motor car at the earliest possible moment in time. Such sensors have been installed within the so-called zone of deformation of a motor vehicle. The sensors are adapted to detect how intense the collision is and trigger safety installations on board of the vehicle, for example safety belt tensioning installations or adaptive multi-stage airbag systems. Prior art sensors are mostly fully-electronic acceleration or deceleration sensors located in the front portion of a vehicle. Such sensors are, for example, located within the suspension of the cooling system, within the chassis or within the shock absorbers. Within the particular art, these sensors are also denominated as "up-front sensors". These sensors generate an output signal corresponding to the particular collision. The output signal is transferred to a central processing unit via an appropriate cable.

Within the central processing unit the output signal is further processed. Conventionally, this is effected with the help of mathematical algorithms according to which the signal is integrated over the collision period of time. From the velocity change resulting therefrom, criteria are derived for triggering the various safety installations.

Considering that in practice collisions of motor vehicles happen under highly varying conditions, the acceleration peak values at the location of the sensors may assume highly different values.

In practice, a dynamic range of about 200:1 within a frequency band of between 50 Hz and 5,000 Hz has to be taken into account. In view of these figures it becomes clear that the limited dynamic range of conventional sensors will result in signal distortions which, in turn, result in a deterioration of the above-mentioned time integral, so that the safety criteria are subjected to an increased and unwanted fuzziness.

German patent specification 41 28 347 C1 discloses an impact-induced pulse sensor which does not operate according to the afore-mentioned principles, i.e. does not derive an analog measuring signal from a physical quantity (acceleration, deceleration). Instead, this prior art sensor is structurally configured as a safety switch or, as identified in the art, a so-called "safing sensor". This prior art sensor simply comprises a conventional spring-mass-system in which an annular magnet is arranged to slide within a tube and may be displaced against the force of a compression spring. When the annular magnet passes by a magnetically operable electrical switch, for example a Reed contact, a measuring signal is generated, namely the switching signal that appears when the Reed contact is closed or opened, respectively. The displaceable magnet is guided with a lateral pin thereon engaging a groove extending along the trajectory of the magnet and being inclined relative thereto. Due to this configuration, a rotational movement is superimposed to the axial movement of the magnet. The configuration of the groove is selected such that the magnet is only slightly decelerated when advancing to an end position, but is strongly decelerated when returning back.

This measure has been taken in order to make the closed period of time of the safety switch highly independent from the particular shape of the collision graph for achieving an overall longer closed period of time.

This prior art sensor, therefore, does not generate an analog measuring signal that would be adapted to be processed further. Therefore, this prior art sensor belongs to an entirely different type of sensors as compared to the one specified at the outset.

In these prior art sensors, the pulse velocity of the displaced sensor element depends on the amplitude and on the duration of the impact acting on the sensor. If measuring results with impact-induced pulses of different amplitude/ duration are compared, which, however, have like pulse areas, these prior art sensors yield differing measuring signals.

U.S. Pat. No. 5,983,724 discloses an impact-induced pulse sensor in which the sensor element comprises a rotor being journalled excentrically and having two magnets at its periphery. These magnets are retained in a predetermined initial position by means of stationary retention magnets being arranged at a distance. In this initial position, the two rotor magnets are located vis-à-vis a respective sensor element. The sensor elements comprise a resistor bridge circuit with magnetoresistive elements.

If an impact or shock is exerted on this prior art sensor within a plane arranged perpendicular to the rotational axis of the rotor, the rotor overcomes the retention force of the retention magnets and departs from its initial rest position. Thereby, the magnets move relatively to the sensor elements and the bridge circuits therein are detuned accordingly. The signal thus generated does not linearly depend on the prevailing acceleration. Therefore, linearizing circuits are provided for generating a linear dependency of the sensor signal from the prevailing acceleration. By means of a comparison with a nominal value, a threshold is defined and, if the threshold is exceeded, a triggering signal is generated by the impact-induced pulse sensor.

Therefore, in this prior art sensor no measuring voltage that would depend from the particular distance of the sensor element is processed and, hence, no independence from the pulse velocity may be achieved.

U.S. Pat. Nos. 5,756,896 and 5,149,925 disclose impact-induced pulse sensors utilizing a linearly moved permanent magnet as a sensor element. U.S. Pat. No. 3,483,759 discloses a velocity transducer comprising a cylindrical rod magnet suspended by a spring within a tube having a winding positioned thereon in such a manner that the movement of the magnet within the tube induces a voltage in the winding proportional to the impact velocity of a shock experienced by the transducer.

It is, therefore, an object underlying the invention to provide an impact-induced pulse sensor of the type specified at the outset such that the above-mentioned disadvantages are avoided. In particular, a sensor output signal shall be generated that is a direct measure for the pulse velocity, i.e. is independent from the duration of the prevailing pulse-shaped impact for like pulse areas of the impact.

SUMMARY OF THE INVENTION

These and other objects are achieved by the invention with an impact-induced pulse sensor comprising:
a housing having a longitudinal axis;
a guiding element arranged on the housing;
a sensor element adapted to be displaced within the housing along the guiding element when an essentially pulse-shaped impact of a given duration is exerted on the housing, the sensor element being displaced with a predetermined speed and along a predetermined distance, the guiding element being configured such as to affect the speed, the sensor element, further, being made of a magnetic material;
a pickup element rigidly connected to the housing for magnetically generating a measuring signal derived from the displacing of the sensor element caused by the impact;
the sensor element, when displaced, generating in the pickup element a measuring voltage depending from the distance, the guiding element affecting the speed such that for impacts with like pulse areas the measuring voltage vs the distance is independent from the duration of the pulse-shaped impact.

The object underlying the invention is thus entirely solved.

If, namely, the guiding element affects, i.e. decreases and/or increases the velocity of the sensor element accordingly, the dependency of the flux integral over the distance may just be compensated. As a consequence, the sensor output signal is a direct measure of the pulse velocity and is independent from the duration of the pulse-shaped impact for like pulse areas.

By doing so, the conventional dynamic mapping may be reduced to an integral mapping having a dynamic range of just about 20:1 within a frequency band of approximately between 0 and 200 Hz. Signal distortions may, thus, be entirely avoided. The measuring results so obtained are unambiguous within the measuring range.

In a preferred embodiment of the inventive sensor, the sensor element is guided within the housing along an inner wall, a guiding groove being provided on the inner wall, the sensor element being provided with a pin engaging the guiding groove, the guiding groove being inclined relative to the longitudinal axis by an angle, the angle varying along the distance.

This measure has the advantage that the desired alteration of the velocity of the sensor element may be achieved in a simple and reliable constructional manner.

According to a preferred modification of this embodiment, the inner wall is a cylindrical wall and the angle follows from the following equations:

$$M_{(x)} = 1 + J/(mr^2 \tan^2 \alpha) \quad (I)$$

$$M'/M_{(x)} = S(\phi'/\phi_{(x)}) \quad (II)$$

where
  α=angle of inclination of the guiding groove along the longitudinal axis
  r=radius of cylindrical inner wall
  x=distance of the sensor element
  m=mass of the sensor element
  $M_{(x)}$=effective mass, normalized on the mass m
  M'=dM/dx
  J=mass moment of inertia of the sensor element
  $\phi_{(x)}$=magnetic flux integral
  $\phi'$=d+/dx
  S=a first parameter of variation, varied in a range of between 0 and 2
  $M_{(O)}$=a second parameter of variation, varied in a range of between 1 and 10
wherein in above differential equation (II) the parameters of variation (S, $M_{(O)}$) are varied empirically within the ranges, until in a calculation of the displaced sensor element the measuring voltage ($U_M$) vs distance (x) is independent of the duration of the pulse-shaped impact for impacts with like pulse areas.

According to further preferred embodiments of the invention, the sensor element is a permanent magnet.

This measure has the advantage that the measuring signals may be obtained with sufficient amplitude and, hence, may be further processed without interference.

Moreover, it is preferred when the pickup element is an induction coil.

This measure has the advantage that analog signals that may easily be further processed, are obtained as measuring signals.

In another particularly preferred embodiment of the inventive sensor the sensor element is displaced along a trajectory and a return magnet is arranged within the trajectory.

This measure has the advantage that the sensor element after having been triggered will automatically return into its initial rest position. In order to avoid misunderstandings, it should be emphasized at this instance that the return magnet, in contrast to sensors of the prior art as discussed at the outset, is not a mandatory element of the system because the sensor according to the invention does not comprise a spring-mass system. The return magnet of the inventive sensor may be deleted without putting its principal operability into question. If the return magnet were not provided, the sensor element would simply assume an undefined position once the sensor has been triggered. This, however, is acceptable for many applications, because when the sensor has been triggered, this is a strong indication that the motor vehicle has suffered a collision damage in which case the impact sensor must be replaced anyway.

According to another preferred measure that may be used as an alternative or additionally relative to the aforementioned measures, the sensor element, when being in an initial position, is retained by means of a holding element, and gets loose from the holding element only if a predetermined detaching force is exceeded.

This measure has the advantage that a well-defined initial or rest position for the sensor element is created and that the sensor element may automatically return into its initial position after having been triggered and may be caught by the holding element as soon as it has returned into a reference position.

Preferably, the holding element is configured as a soft magnetic plate holding the sensor element in its initial position across a predetermined magnetic air gap with a predetermined retention force.

Moreover, certain embodiments of the invention are preferred in which the sensor element is displaced along a trajectory and a test pickup element is arranged within the trajectory between an initial position of the sensor-element and the pickup element. The latter is, preferably, a test pickup coil.

These measures have the advantage that a self-test of the impact sensor is possible so that at certain moments in time the safety installations of the motor vehicle may be checked.

Further advantages will become apparent from the description and the enclosed drawing.

It goes without saying that the afore-mentioned elements and those that will be explained hereinafter, may not only be used in the particularly given combination, but also in other combinations or alone, without leaving the scope of the present invention.

Embodiments of the invention are shown in the drawing and will be described further throughout the subsequent description.

Figure 1:
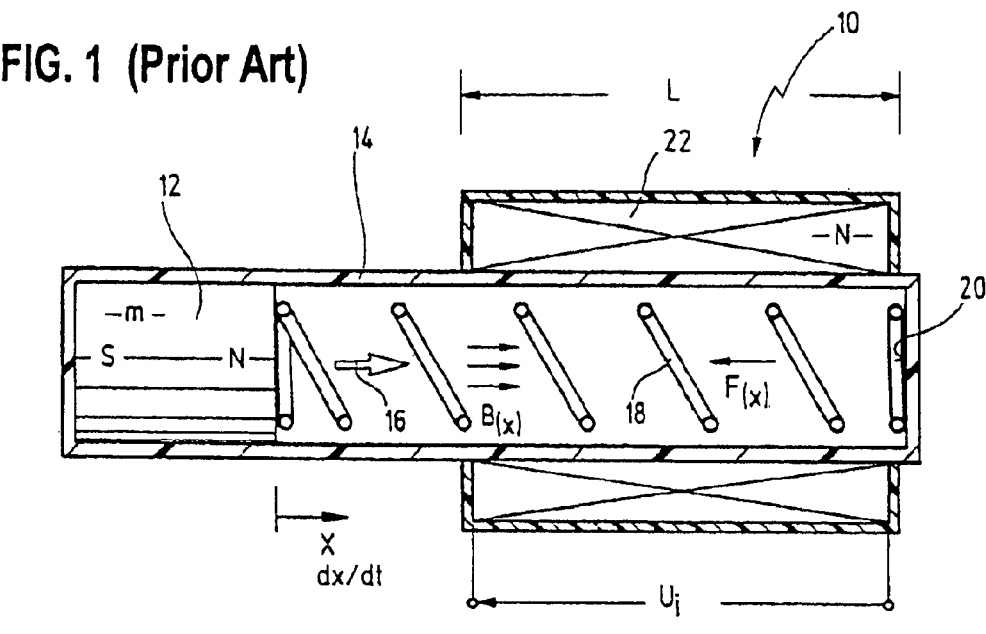
FIG. 1 shows a side-elevational, sectional view of an embodiment of an impact sensor according to the prior art.

In FIG. 1, reference numeral 10 generally indicates an impact-induced pulse sensor according to the prior art. Impact sensor 10 comprises a permanent magnet 12 being magnetized in an axial direction. Permanent magnet 12 is disposed to slide within a tubular sensor housing 14. When an impact or shock is exerted on impact sensor 10, permanent magnet 12 moves from an initial rest position shown in FIG. 1 towards the right hand side as shown with an arrow 16. In its rest position, permanent magnet 12 is retained by means of a spring 18 which is supported on a wall 20 of sensor housing 14 opposite permanent magnet 12. Sensor housing 14 on an area thereof shown on the right hand side in FIG. 1 is surrounded by a measuring coil 22.

When an impact acting in the axial direction is exerted on impact sensor 10, permanent magnet 12 will move within sensor housing 14 due to the jolt acting from outside, and with an instantaneous velocity dx/dt in the x-direction, and against a reset force $F_{(x)}$. The magnetic induction $B_x$ originated by permanent magnet 12 will induce an electrical voltage $U_i$ within measuring coil 22 having a number N of windings and a winding length L. Voltage $U_i$ is induced as long as permanent magnet 12 is in motion. As soon as the exertion of an external force is terminated, permanent magnet 12 will return into its rest position x=0 due to return force $F_{(x)}$, generated by spring 18. The induced voltage $U_i$ generated within measuring coil 22 is given by:

$$U_i = \frac{N}{L} \cdot \Phi_{(x)} dx/dt \qquad (1)$$

Within this formula, $\Phi_{(x)}$ stands for the magnetic flux integral given by the difference between the magnetic flux flowing through measuring coil 22 at the beginning of the winding and the end of the winding of measuring coil 22 and, further, by the geometry of the system, consisting of permanent magnet 12 and of measuring coil 22. The instantaneous velocity dx/dt may be computed from the movement equation of permanent magnet 12 and is given as:

$$dx/dt = \Delta v - v_d; \quad v_d = \frac{1}{m}\int_o^{\Delta t} F(x) dt \qquad (2)$$

The expression $\Delta v$ designates the pulse velocity being the true measured quantity in the present context. The expression $v_d$ is the so-called pulse loss that is derived from the impact-time-integral of return force $F_{(x)}$ over the collision duration $\Delta t$.

Figure 2:
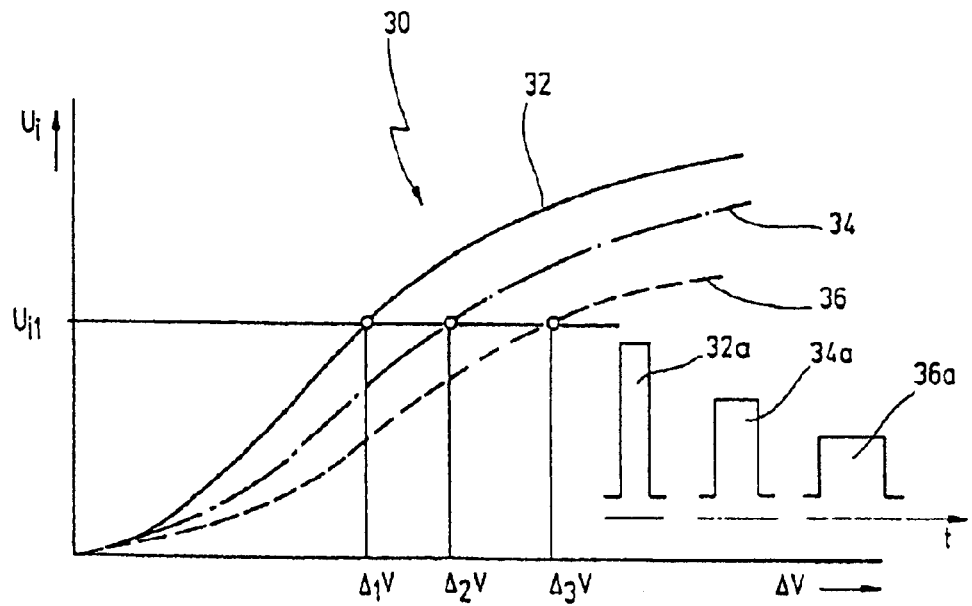
FIG. 2 shows a diagram for explaining the operation and the disadvantages of the impact sensor of FIG. 1 to the extent as they are of interest in the present context.

The sensor characteristics $U_i = f_{(\Delta v)}$ defined by equations (1) and (2) is shown as a first diagram 30 according to FIG. 2. First diagram 30 comprises a first graph 32 showing in solid lines a measured graph for an impact pulse which, in FIG. 2, is designated with 32a in a time-dependent illustration. A second curve 34 in dash-dot lines shows the graph for a second impact pulse 34a, and a third graph 36 in dashed lines shows the corresponding graph for an impact pulse 36a. Impact pulses 32a, 34a and 36a always have the same area (at different acceleration amplitudes and pulse durations).

As may easily be seen from graphs 32, 34 and 36, these graphs are strongly dependent from the duration of impact pulses 32a, 34a and 36a, so that the measuring result is not "neutral" but has a so-called "dispersion" instead between graphs 32, 34 and 36. As a result, a given measuring voltage $U_{il}$ may be associated to three distinct pulse velocities $\Delta_1 v$, $\Delta_2 v$ and $\Delta_3 v$, according to how long impact pulses 32a, 34a and 36a have been.

Figure 3:
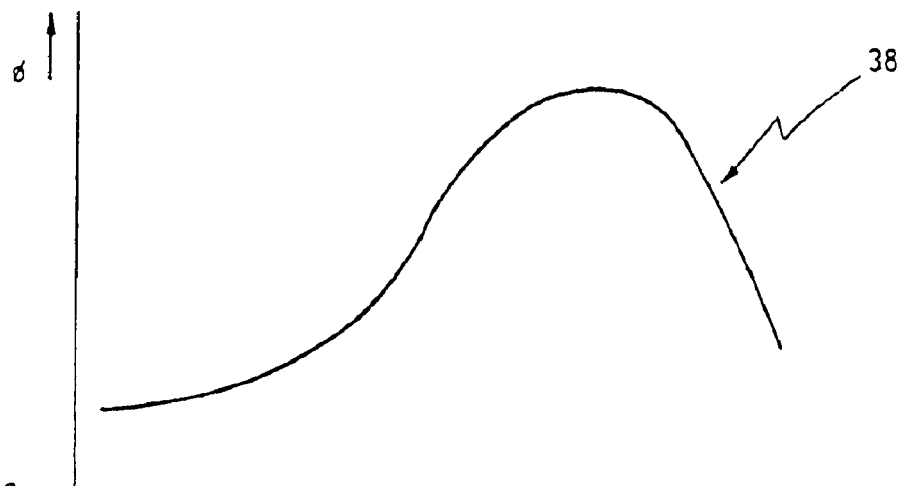
FIG. 3 shows a diagram showing the flux integral over the distance for the prior art impact sensor of FIG. 1.

The reason therefore is that permanent magnet 12 according to equation (2) has suffered the pulse loss $v_d$ and that the magnetic flux integral $\Phi$ according to equation (1) is not constant over the distance x of displacement of permanent magnet 12. This is again shown in FIG. 3 with a second diagram 38. The non-existence of constant magnetic flux integrals $\Phi$ over the distance x depends on the particular sensor design and is unavoidable.

On the other hand side, the pulse loss $v_d$ results in a shortened distance x of displacement as compared to an unobstructed path, i.e. without return force, so that a compact length of the impact sensor 10 becomes possible which does not exceed the available space within a motor vehicle.

According to the present invention, the existent dependency of the magnetic flux integral $\Phi$ from the distance shall be compensated for by appropriate design measures in order to overcome a conflict of interest between the pulse loss $v_d$ while maintaining a compact length of impact sensor 10.

Figure 4:
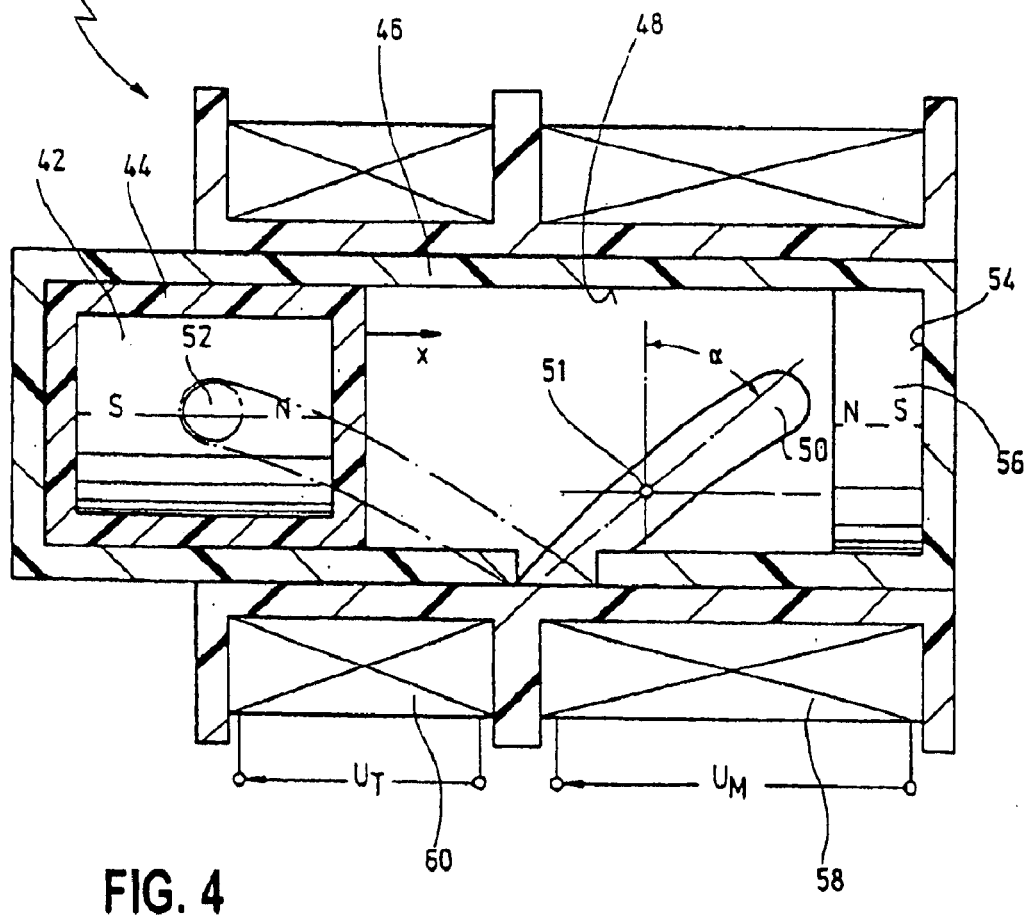
FIG. 4 shows an illustration, similar to that of FIG. 1, however, for an embodiment of an impact sensor according to the present invention.

According to the present invention, this is achieved with an impact pulse sensor 40 as shown in FIG. 4.

Impact pulse, sensor 40 comprises a permanent magnet 42 surrounded by a magnetic housing 44. Permanent magnet 42 within magnet housing 44 is journalled to slide axially within a tubular sensor housing 46. An inner wall 48 of sensor housing 46 is preferably configured cylindrical for that purpose.

Figure 5:
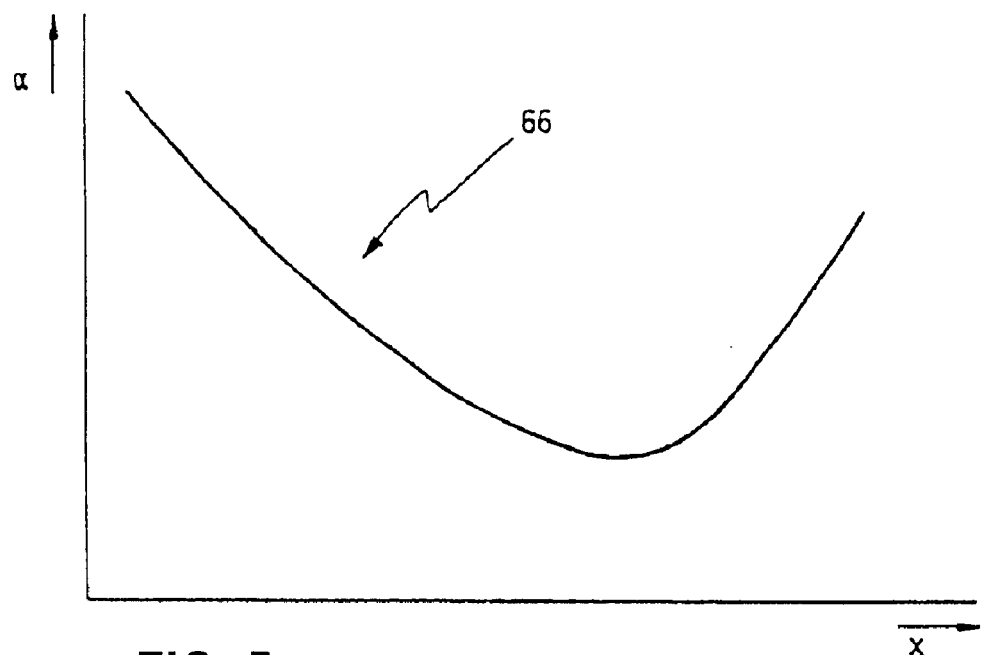
FIG. 5 shows a diagram for explaining the impact sensor of FIG. 4.

A guiding groove 50 is provided on inner wall 48 and has a pitch designated by α at a particular point 51. Over the axial length x, angle α has a function as shown in FIG. 5 with a third diagram 66.

A pin 52 is provided on magnet housing 44 engaging guiding groove 50.

FIG. 4 shows permanent magnet 42 in its rest position. A return magnet 56 of opposite axial polarization is provided at an axially opposing wall 54 of sensor housing 46. Return magnet 56 keeps permanent magnet 42 within the rest position shown in FIG. 4. As an alternative, a corresponding magnet, configured as an attracting magnet, could be arranged on the left hand side of permanent magnet 42 between magnet housing 44 and the left end wall of sensor housing 46.

A measuring coil 58 is disposed around the right hand side of sensor housing 46 in FIG. 4 which axially adjoins a test coil 60 on the left hand side thereof.

With respect to the physical quantities used, reference may be made to the description of FIG. 1 for the sake of simplicity.

If an acceleration is exerted on sensor 40 from outside in an axial direction, permanent magnet 42 will effect a translatory movement within sensor housing 46 in the direction x. This translatory movement, however, will be superimposed with a rotary guided movement due to the guiding of pin 52 on magnet housing 44 within essentially helical guiding groove 50. This guided rotary movement has a varying rotational velocity due to the fact that pitch angle α varies over distance x (cf. FIG. 5). As can be seen from FIG. 5, pitch angle α over distance x decreases first, then goes through a minimum and, subsequently, increases again. As a consequence, permanent magnet 42 in its translatory movement will first be decelerated (decreasing pitch angle α) and then, from a minimum of velocity, will be again accelerated.

The arrangement described before has two effects. On the one hand side, permanent magnet 42 along distance x of movement will be subjected to a deceleration due to its mass moment of inertia J, with the consequence that permanent magnet 42 during a collision of the motor vehicle will not reach, as intended, the right hand side, i.e. the mechanical stop of sensor housing 46 within the measuring range of the pulse velocity Δv under observation.

On the other hand side, permanent magnet 42 will be subjected to an additional deceleration or an additional acceleration, respectively, each depending from its instantaneous position x, with which the decelerated instantaneous velocity dx/dt of permanent magnet 42 is modulated.

The dependency of pitch angle $\alpha_{(x)}$ from the distance x is selected such that by an appropriate design of guiding groove 50 within sensor housing 46 the unavoidable variation of the magnetic flux integral Φ (cf. FIG. 3) is just compensated by the additional modulation of the instantaneous velocity dx/dt according to equation (1).

If desired, a return force for permanent magnet 42 may be provided by means of return magnet 56, however, this is not necessary per se. Assuming that impact pulse sensor 40 is activated only one time during its lifetime, namely if a collisional damage happens to the motor vehicle, it is not necessary that impact pulse sensor 40 be made operative for repeated use. Therefore, return magnet 56 or, as an alternative, a catch magnet on the left hand side of permanent magnet 42 in FIG. 4 may be deleted at all. The afore-mentioned elements, however, could under certain circumstances be of use because they might guarantee a defined rest position of permanent magnet 42 also in situations where impact pulse sensor 40 is exposed to substantial concussions during operation which should not yet trigger impact pulse sensor 40.

Measuring coil 58 is preferably wound onto a coil body which, in turn, is shoved onto sensor housing 46. Measuring voltage $U_M$ may be picked from terminals of measuring coil 58.

In order to exclude influences from the ambient temperature on the amplitude of measuring voltage $U_M$ to the best possible extent, permanent magnet 42 and, if provided, return magnet 56 are from a temperature-insensitive magnetic material, preferably from a samarium-cobalt-alloy, being characterized by an extremely low temperature coefficient of its saturation inductance.

A test pickup coil 60 is preferably provided adjacent measuring coil 58. By means of test pickup coil 60, the function of impact pulse sensor 40 may be checked by way of a self-test.

For that purpose, an electromagnetic field is generated within test pickup coil 60 by applying a test voltage $U_T$ or an equivalent test current. As a consequence, permanent magnet 42 is displaced from the rest position shown in FIG. 4 to the right hand side, until it comes into the magnetic center of test pickup coil 60, where it is positioned essentially coaxially to the latter. Measuring voltage $U_T$ is now switched off and permanent magnet 42 will return into its rest position under the sole action of the return force. The voltage that had thereby been induced into measuring coil 58 now indicates that impact pulse sensor 40 is operative. Considering that measuring voltage $U_M$ due to the return movement of permanent magnet 42 in that case has an inverted polarity as compared to that of a "true" measuring voltage $U_M$ in case of a collision of the motor vehicle, the measuring signal may unambiguously and advantageously be distinguished in that test mode from the measuring signal as such.

For example, the afore-mentioned test mode may be executed during each starting of the motor or during each actuation of the ignition system of the motor vehicle. It is, thus, avoided that the test mode by chance coincides with a collision event, so that the triggering of safety installations on board of the motor vehicle is not obstructed.

For what concerns the dimensioning of guiding groove 50 or the course of pitch angle α along distance x as shown in the third diagram 66 of FIG. 5, the following consideration is applied:

The above-mentioned compensation of the magnetic flux integral (FIG. 3) over the entire distance x of displacement can be determined from the motion equation of permanent magnet 42.

According to the Hamilton principle, the motion equation follows the condition dE/dt=0, where E is the entire energy of the mechanical system. E is given by the equation:

$$E = \frac{1}{2}m(dx/dt)^2 + \frac{1}{2}J(d\varphi/dt)^2 + \int F(x)dx \tag{3}$$

The first expression of equation (3) describes the kinetic energy of permanent magnet 42 with mass m and the instantaneous velocity dx/dt. The second expression stands for the rotational energy of permanent magnet 42 generated by the controlled guiding, considering the mass moment of inertia J and the instantaneous angular velocity dφ/dt. The third expression stands for the potential energy of permanent magnet 42 against return force $F_{(x)}$, if the latter is provided.

Guiding groove 50 within sensor housing 46 essentially describes a helical curve, however, with the special aspect that pitch angle α along distance x of displacement is not constant. Therefrom, the mandatory condition in differential form is:

$$dx = rd\Phi \cdot \tan \alpha(x) \quad (4)$$

where r is the radius of inner wall 48 of sensor housing 46. If permanent magnet 42 is displaced by distance dx, it is rotated about angular element dΦ about the x-axis. The amount of rotation is determined by the pitch angle α(x) at the particular distance x. The motion equation of permanent magnet 42 results from equation (3) under consideration of equation (4) within the so-called "M-representation" to be:

$$d^2x/dt^2 + \frac{1}{2}\frac{dM/dx}{M}(dx/dt)^2 + \frac{1}{M}\left[\frac{F(x)}{m} - a_x\right] = 0 \quad (5)$$

in connection with $$M = 1 + J/(mr^2 \cdot \tan^2 \alpha) \quad (6)$$

The quantity M is the so-called "effective mass", i.e. the mass normalized on the mass m of permanent magnet 42. The latter implicitly depends on distance x. M' is the total differential ratio of M depending on x. $a_x$ is the acceleration acting from outside within the x-direction. Function $M_{(x)}$ must now be determined such that the condition of compensation:

$$\frac{dM/dx}{M} = S\frac{d\Phi/dx}{\Phi} \quad (7)$$

is fulfilled. dΦ/dx is the differential ratio of Φ depending on x. It results from the inclination of the known function $\Phi_{(x)}$ according to FIG. 3. The quantity S as well as the boundary condition $M_{(0)}$ are arbitrarily given variation parameters, by means of which $M_{(x)}$ may be computed from motion equation (7). From auxiliary quantity $M_{(x)}$, thereby determined, it is finally possible to obtain the desired path angle $\alpha_{(x)}$ according to equation (6) providing the desired self-compensation of permanent magnet 42. The differential approach according to equation (7) surprisingly provides a useful solution for the, self-compensation under consideration of the two dimensionless variation parameters S and $M_{(0)}$, if variation parameter S is varied between 0 and 2 and boundary condition $M_{(0)}$ for differential equation (7) is varied empirically between 1 and 10. This is done as long as a control computation of the graphs of the measuring voltage vs the pulse velocity leads from the initial situation of FIG. 2 to the final situation as shown in FIG. 6, in which like graphs are designated with the same reference numerals as in FIG. 2 and an apostrophe is added.

Seen as a whole, FIG. 5 illustrates the finally obtained graph of pitch angle α as a function of x over the entire distance of displacement (compensation graph) of permanent magnet 42 within sensor housing 46. This distance, for example, amounts to 17 mm.

Figure 6:
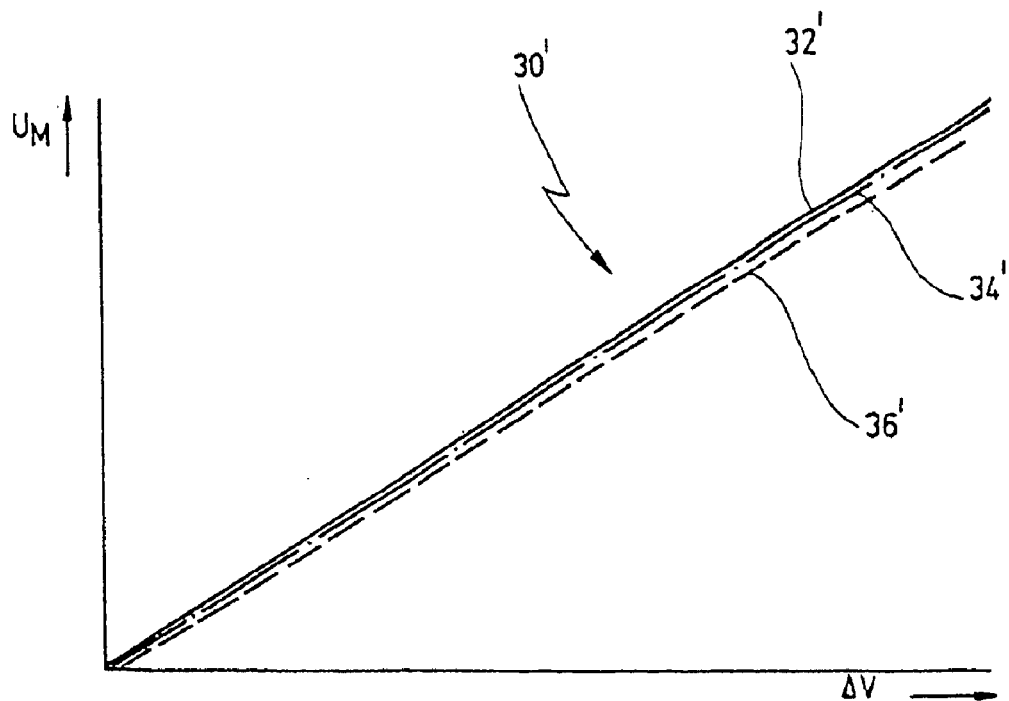
FIG. 6 shows an illustration, similar to that of FIG. 2, however, for the inventive impact sensor of FIG. 4.

As already mentioned, FIG. 6 shows the resulting characteristic of impact pulse sensor 40 with compensation which results according to equation (1) by means of dx/dt by a simple integration of equation (5). Measuring voltage $U_M$ at like pulse areas is almost entirely independent of the duration of the impact pulse and, in the present context, provides an unambiguous transfer function of impact pulse sensor 40 over the entire measuring range. Within a good approximation, it even has a linear graph simplifying further processing of the signal within a central processing unit.

Impact pulse sensor 40 according to the present invention, therefore, generates a measuring quantity derived from the pulse velocity and not from the acceleration, thereby being a direct measure for the impact amplitude. In principle, no external voltage supply is required for impact pulse sensor 40 because due to the magnetic-inductive functional principle, a generator voltage appears at the sensor output which is generated by the measurement itself.

Due to the afore-described self-compensation of moving permanent magnet 42, the output signal is neutral and unambiguous.

Even when a relatively high return force is used, the pulse loss of the runner is negligible due to the relatively high effective mass m of permanent magnet 42.

Moreover, output signal $U_M$, as can clearly be seen from FIG. 6, is unambiguous for what concerns pulse velocity Δv, and, moreover, an almost linear sensor characteristic may be obtained.

Moreover, with the inventive impact pulse sensor 40, a self-test of all of the elements shown in FIG. 4, i.e. from moved permanent magnet 42 through all of the connecting cables, may be achieved.

Finally, a compact length of sensor housing, 46 is achieved.

What is claimed is:

1. An impact-induced pulse sensor comprising:

a housing having a longitudinal axis;

guiding means arranged on said housing;

a sensor element adapted to be displaced within said housing along said guiding means when an essentially pulse-shaped impact of a given duration is exerted on said housing, said sensor element being displaced with a predetermined speed (dx/dt) and along a predetermined distance (x), said guiding means being configured such as to affect said speed (dx/dt), said sensor element, further, being made of a magnetic material;

pickup means rigidly connected to said housing for magnetically generating a measuring signal ($U_i$; $U_M$) derived from said displacing of said sensor element caused by said impact;

said sensor element, when displaced, generating in said pickup means a measuring voltage ($U_M$) depending from said distance (x), said guiding means affecting said speed (dx/dt) such that for impacts with like pulse areas said measuring voltage ($U_M$) vs said distance (x) is independent from said duration of said pulse-shaped impact.

2. The sensor of claim 1, wherein said sensor element is guided within said housing along an inner wall, a guiding groove being provided on said inner wall, said sensor element being provided with a pin engaging said guiding groove, said guiding groove being inclined relative to said longitudinal axis by an angle (α), said angle (α) varying along said distance (x).

3. The sensor of claim 2, wherein said inner wall is a cylindrical wall and said angle (α) is derived from the following equations:

$$M_{(x)} = 1 + J/(mr^2 \tan^2 \alpha) \quad (I)$$

$$M'/M_{(x)} = S(\phi'/\phi_{(x)}) \quad (II)$$

where

α=angle of inclination of said guiding groove along said longitudinal axis r=radius of cylindrical inner wall x=distance of said sensor element m=mass of said sensor element $M_{(x)}$=effective mass, normalized on said mass m $M'=dM/dx$ J=mass moment of inertia of said sensor element $\phi_{(x)}$=magnetic flux integral $\phi'=d\phi/dx$ S=a first parameter of variation, varied in a range of between 0 and 2

$M_{(0)}$=a second parameter of variation, varied in a range of between 1 and 10 wherein in above differential equation (II) said parameters of variation (S, $M_{(0)}$) are varied empirically within said ranges, until in a calculation of said displaced sensor element said measuring voltage ($U_M$) vs distance (x) is independent of said duration of said pulse-shaped impact for impacts with like pulse areas.

4. The sensor of claim 1, wherein said sensor element is a permanent magnet.

5. The sensor of claim 1, wherein said pickup means is an induction coil.

6. The sensor of claim 1, wherein said sensor element is displaced along a trajectory and a return magnet is arranged within said trajectory.

7. The sensor of claim 1, wherein said sensor element, when being in an initial position, is retained by means of a holding element, and gets loose from said holding element only if a predetermined detaching force is exceeded.

8. The sensor of claim 7, wherein said holding element is configured as a soft magnetic plate holding said sensor element in its initial position across a predetermined magnetic air gap with a predetermined retention force.

9. The sensor of claim 1, wherein said sensor element is displaced along a trajectory and a test pickup element is arranged within said trajectory between an initial position of said sensor element and said pickup means.

10. The sensor of claim 1, wherein said test pickup element is a test pickup coil.

* * * * *